US008966149B2

(12) United States Patent
Fleming et al.

(10) Patent No.: US 8,966,149 B2
(45) Date of Patent: *Feb. 24, 2015

(54) EMULATION OF AN INPUT/OUTPUT ADVANCED PROGRAMMABLE INTERRUPT CONTROLLER

(71) Applicant: Intel Corporation, Santa Clara, CA (US)

(72) Inventors: Bruce Fleming, Morgan Hill, CA (US); Arvind Mandhani, San Francisco, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/738,483

(22) Filed: Jan. 10, 2013

(65) Prior Publication Data

US 2013/0124769 A1    May 16, 2013

Related U.S. Application Data

(63) Continuation of application No. 12/650,580, filed on Dec. 31, 2009, now Pat. No. 8,380,908.

(51) Int. Cl.
*G06F 13/24* (2006.01)
*G06F 13/10* (2006.01)

(52) U.S. Cl.
CPC ............. *G06F 13/24* (2013.01); *G06F 13/105* (2013.01)

USPC ............ 710/262; 710/260; 710/261; 710/266

(58) Field of Classification Search
USPC ......................... 710/260–262, 266
See application file for complete search history.

(56) References Cited

U.S. PATENT DOCUMENTS

| 5,727,217 | A | * | 3/1998 | Young ........................... 710/260 |
| 5,857,090 | A | * | 1/1999 | Davis et al. .................... 703/25 |
| 5,862,366 | A | * | 1/1999 | Schmidt et al. ................. 703/21 |
| 7,143,223 | B2 | * | 11/2006 | Hack et al. .................... 710/266 |
| 7,209,994 | B1 | * | 4/2007 | Klaiber et al. ................. 710/264 |
| 7,707,341 | B1 | * | 4/2010 | Klaiber et al. ................. 710/244 |
| 7,853,744 | B2 | * | 12/2010 | Mahalingam et al. ........ 710/262 |
| 7,953,916 | B2 | * | 5/2011 | Pan et al. ...................... 710/268 |
| 2006/0085179 | A1 | * | 4/2006 | Hack et al. .................... 703/23 |
| 2006/0218328 | A1 | * | 9/2006 | Vega et al. .................... 710/260 |
| 2008/0294825 | A1 | * | 11/2008 | Mahalingam et al. ........ 710/262 |
| 2010/0191889 | A1 | * | 7/2010 | Serebrin ....................... 710/269 |
| 2010/0262737 | A1 | * | 10/2010 | Pan et al. ...................... 710/260 |

* cited by examiner

*Primary Examiner* — Ryan Stiglic
(74) *Attorney, Agent, or Firm* — Thomas R. Lane

(57) ABSTRACT

Embodiments of systems, apparatuses, and methods for emulating an input/output Advanced Programmable Interrupt Controller are disclosed. In one embodiment, an apparatus includes a first interrupt controller having a first programming model, and emulation logic to emulate a second interrupt controller having a second programming model that is different from the first programming model. The emulation logic is also to mask one of a plurality of interrupt requests to the first interrupt controller for each of the plurality of interrupt requests handled by the emulation logic.

20 Claims, 5 Drawing Sheets

METHOD 500

US 8,966,149 B2

EMULATION OF AN INPUT/OUTPUT ADVANCED PROGRAMMABLE INTERRUPT CONTROLLER

RELATED APPLICATIONS

This application is a continuation of U.S. patent application Ser. No. 12/650,580, entitled "ADVANCED PROGRAMMABLE INTERRUPT CONTROLLER," filed Dec. 31, 2009.

BACKGROUND

1. Field

The present disclosure pertains to the field of information processing, and more particularly, to the field of managing interrupts in information processing systems.

2. Description of Related Art

Many personal computer and other information processing systems manage interrupts according to Intel® Corporation's Advanced Programmable Interrupt Controller ("APIC") architecture or an interrupt architecture based on the APIC architecture. One or more processors in such a system may include a local APIC, and the system may include one or more input/output ("I/O") APICs. An I/O APIC may be integrated with or into another system component, such as a memory controller, a bus controller, or an I/O controller. An I/O APIC may communicate with local APICs through messages on the bus or other interface between the processors and memory, and/or through a dedicated APIC bus or other interface.

The hardware for an I/O APIC includes storage for a set of programmable registers along with state machines to control storage and processing of register values. Two of the registers of the I/O APIC, namely the I/O register select ("IOREGSEL") register and the I/O window ("IOWIN") register, are directly accessible through memory mapped I/O transactions, while the others are indirectly accessible using an index value from the IOREGSEL register and a data value from the IOWIN register. Typically, the addresses for the IOREGSEL and IOWIN registers are FEC00000h and FEC00010h, respectively, but these registers may be relocated. The register set also includes twenty-four redirection registers, each having a width of sixty-four bits, collectively referred to as the redirection table. Each of these registers corresponds to one of twenty-four interrupt request inputs to the I/O APIC. The format of a redirection table entry ("RTE") includes a field to store an eight-bit interrupt vector, which is sent to the processor(s) with the corresponding interrupt request. The processor uses the interrupt vector to identify an entry in the interrupt descriptor able, from which the interrupt handler may be found.

BRIEF DESCRIPTION OF THE FIGURES

The present invention is illustrated by way of example and not limitation in the accompanying figures.

DETAILED DESCRIPTION

Embodiments of apparatuses, methods, and systems for emulating an input/output advanced programmable interrupt controller are described. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

It may be desirable to use a processor having a local APIC in an information processing system that does not include an I/O APIC. For example, a processor in the Intel(g) Pentium® Processor Family from Intel® Corporation may be used in a system that includes an interrupt controller other than an I/O APIC. The other interrupt controller may be used instead of an I/O APIC for any reason, for example, because the system may include an input/output controller having its own interrupt controller. Therefore, embodiments of the present invention provide for emulating an I/O APIC. Embodiments of the present invention may be desirable because they may provide for compatibility with the APIC specification at a lower hardware cost than by using an I/O APIC, and because they may provide the flexibility to increase the number of interrupt sources beyond the number provided for by a hardware I/O APIC.

Figure 1:
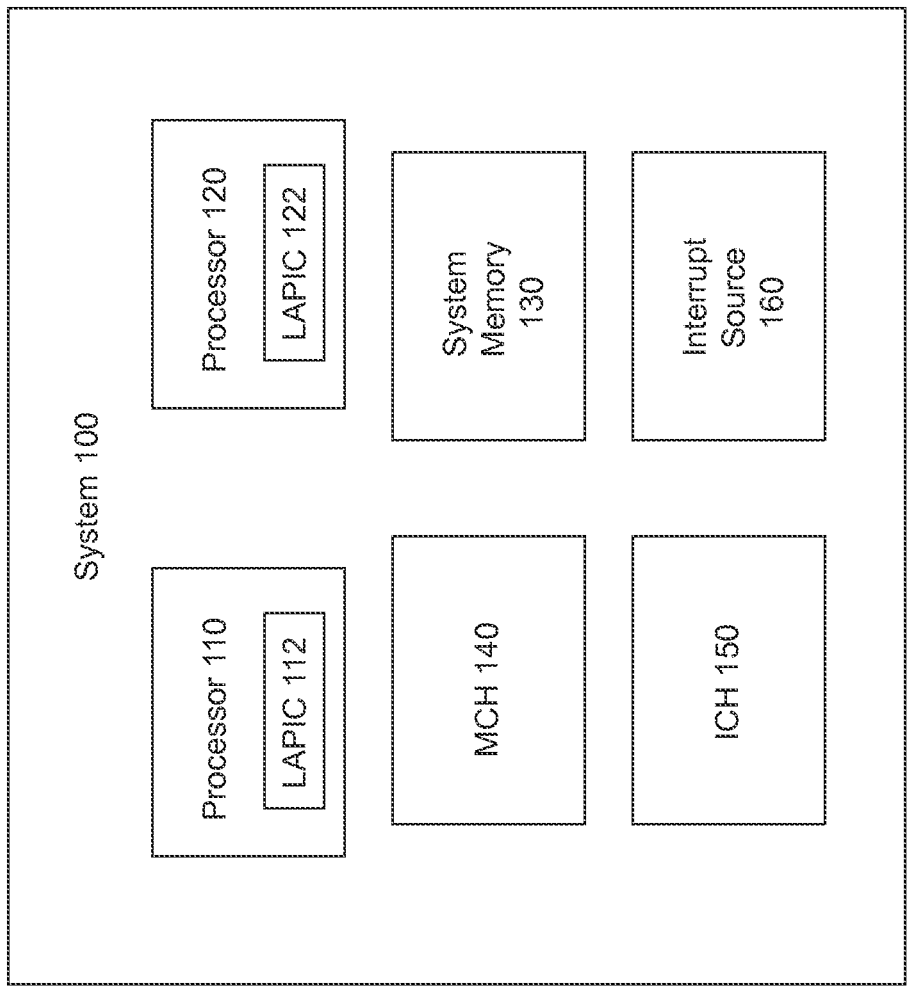
FIG. 1 illustrates a system eluding emulation of an I/O APIC according to an embodiment of the present invention.

FIG. 1 illustrates an embodiment of the present invention in a system, specifically information processing system 100. Information processing system 100 may be any information processing apparatus capable of executing any software or firmware. For example, information processing system 100 may represent a personal computer, a mainframe computer, a portable computer, a handheld device, a set-top box, a server, or any other computing system. Information processing system 100 includes processors 110 and 120, system memory 130, memory control hub ("MCH") 1140, I/O control hub ("ICH") 150, and interrupt source 160. Processors 110 and 120, system memory 130, 140, ICH 150, and interrupt source 160 may be coupled to or communicate with each other according to any known approach, such as directly or indirectly through one or more buses, point-to-point, or other wired or wireless connections. Information processing system 100 may also include any number of additional components or connections. Furthermore, the components in information processing system 100 may be integrated or combined into any number of chips or packages. For example, MCH 140 may be integrated into a chip or package including one or both of processors 110 and 120.

Processors 110 and 120 may be any type of processor, including a general purpose microprocessor, such as a processor in the Intel® Pentium® Processor Family, Itanium® Processor Family, or other processor family from Intel® Corporation, or another processor from another company, or a digital signal processor or microcontroller. Processors 110 and 120 may each include multiple threads and multiple execution cores, in any combination. Processor 110 may include or otherwise have assigned to it local APIC 112, and processor 120 may include or otherwise have assigned to it local APIC 122. Although FIG. 1 shows two processors, information processing system 100 may include only a single processor or any number of processors. Likewise, information processing system 100 may include only a single local APIC or any number of local APICs. The number of local APICs in information processing system 100 may, but need not, correspond to the number of processors in information processing system 100.

System memory 130 may be static or dynamic random access memory, or any other type of medium readable by processors 110 and 120, or any combination of such mediums. MCH 140 may include any logic, circuitry, or other hardware to control the transfer of information between system memory 130 and any other component in information processing system 100, such as processors 110 and 120. MCH 140 may also include any other logic, circuitry, or other hardware to perform any other functions, such as passing and/or translating transactions and/or other communications between ICH 150 and processors 110 and 120 and system memory 130.

ICH 150 may include logic, circuitry, or other hardware to manage system logic, peripherals, and I/O devices in information processing system 100, which may be integrated into ICH 150 and/or may communicate with ICH 150, and to control the transfer of information between these devices and any other component in info nation processing system 100, such processors 110 and 120 and system memory 130. ICH 150 may also include any other logic, circuitry, or other hardware to perform any other functions, such as passing and/or translating transactions and/or other communications between MCH 140 and any peripherals, I/O devices, or other components in information processing system 100.

Interrupt source 160 may represent or include any source of hardware, software, or other type of interrupt possible within an information processing system, such as an I/O or peripheral device, any form of system logic such as a timer, or any processor, controller, or other component that can generate hardware or software interrupts. Interrupt source 160 may be integrated into or separate from 150.

Figure 2:
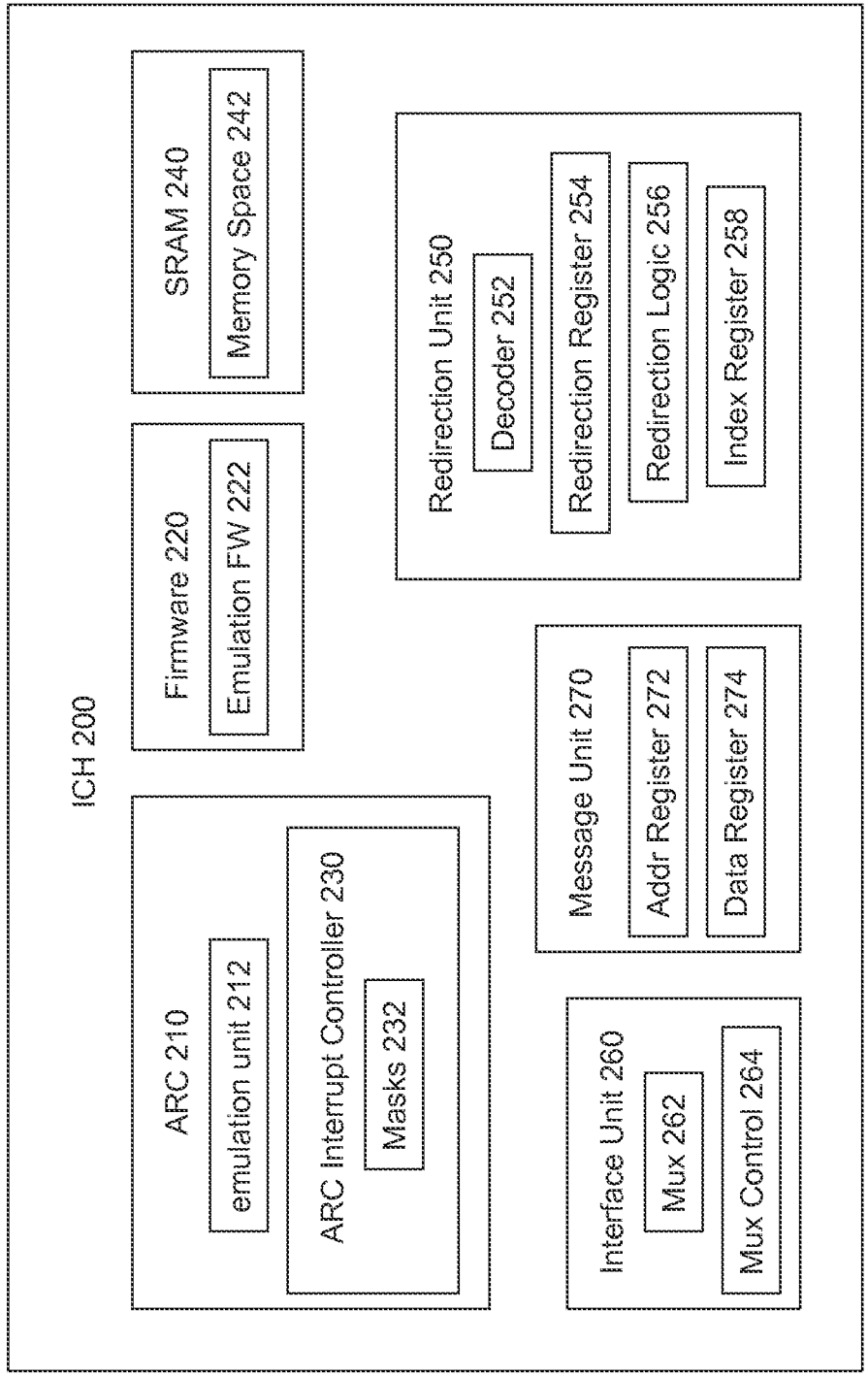
FIG. 2 illustrates an apparatus for emulating an I/O APIC according to an embodiment of the present invention.

FIG. 2 illustrates an embodiment of the present invention in an apparatus, specifically ICH 200, which may correspond to ICH 150 in FIG. 1. ICH 200 may include processor 210, emulation unit 212, firmware 220, emulation firmware 222, interrupt controller 230, interrupt mask storage location 232, memory 240, memory space 242, redirection unit 250, decoder 252, redirection storage location 254, redirection logic 256, index storage location 258, interface unit 260, multiplexers 262, multiplexer configuration storage location 264, messaging unit 270, message address storage location 272, and message data storage location 274.

Processor 210 may be any processor, controller, or processor or controller core to manage the functions provided by ICH 200. In one embodiment, processor 210 may be a microcontroller based on an ARC® configurable processor core. Therefore, processor 210 may be referred to as the "ARC processor" in this specification.

Firmware 220 may be any medium in which instructions executable by processor 210 may be stored, such as semiconductor read-only, programmable, or re-programmable memory, storing instructions that when executed by processor 210 cause processor 210 to manage the functions provided by ICH 200. Firmware 220 may include emulation firmware 222, which may include instructions that when executed by processor 210 cause processor 210 to emulate an interrupt controller, as described below and illustrated in FIG. 3.

Emulation unit 212 may include any logic, circuitry, or other hardware to support the emulation of an interrupt controller. For example, emulation unit 212 may be or may be part of a controller or processor, such as processor 210, to execute emulation firmware or software. In this embodiment, emulation unit 212 is to support the execution of emulation firmware 222 to emulate an I/O APIC, such that software written for an information processing system including an I/O APIC may run on information processing system 100 with the same result as if information processing system 100 included an I/O APIC.

Interrupt controller 230 may include any logic, circuitry, or other hardware to manage interrupts or exceptions in an information processing system such as information processing system 100. For example, interrupt controller 230 may be an interrupt controller built into the ARC processor, configured to receive and manage interrupts from interrupt sources, such as peripheral and I/O controllers and devices, included in or managed by ICH 200. Therefore, interrupt controller 230 may be referred to as the ARC interrupt controller in this specification. In one embodiment, interrupt controller 230 is designed to receive level sensitive interrupt request signals, which may allow each of the interrupt request lines to be shared by multiple interrupt sources. Interrupt controller 230 may include interrupt mask storage location 232, which may include storage for a programmable mask bit or other indicator for each potential interrupt request, to indicate whether the interrupt request is to be recognized or ignored by interrupt controller 230.

Memory 240 may be any type of medium readable by processor 200. In one embodiment, memory 240 is static random access memory. Memory 240 may include memory space 242, which in one embodiment may be a contiguous portion of memory 240 at least as large as the space needed for the indirectly accessible register set of an I/O APIC. In other embodiments, memory space 242 may be non-contiguous or may be smaller than the space needed for the indirectly accessible register set of an I/O APIC. Memory space 242 may be used to store information associated with an I/O APIC. This information may be the information, such as the RTEs, that would be stored in the indirectly accessible register set of an I/O APIC in a prior art information processing system including an I/O APIC.

Redirection unit 250 may include any logic, circuitry, or other hardware to facilitate the emulation of an interrupt controller by decoding transactions directed to an I/O APIC and causing ICH 200 to respond to these transactions. Redirection unit 250 may include decoder 252, which may include any logic, circuitry, or other hardware to decode addresses associated with directly accessible or memory mapped registers of an I/O APIC, such as FEC00000h and FEC00010h, such that ICH 200 may receive and/or respond to transactions directed to these addresses. Redirection unit 250 may also include redirection storage location 254, which may be a register or any other type of storage location to store a value representing the base address of memory space 242. Therefore, redirection storage location 254 may be a programmable redirection register, which may be programmed with a base address of portion of memory 240 to which transactions intended for the indirectly accessible I/O APIC registers are redirected. Redirection unit 250 may also include redirection logic 256, which may include any logic, circuitry, or other hardware to redirect transactions directed to an intended storage location to a different storage location. In this embodiment, redirection logic 256 is to redirect a transaction intended for an indirectly accessible I/O APIC register. Instead of an I/O APIC register, the transaction data is stored in or retrieved from memory space 242. To achieve his result, redirection logic 256 may be configured to add the index value received in a IOREGSEL write transaction and the base address value stored in redirection storage location 254, then redirect an IOWIN read or write transaction to the location in memory 240 specified by the sum. Therefore, all of the information typically written to and/or read from the indirectly accessible register set of an I/O APIC may be written to and/or read from memory space 242. Redirection unit 250 may also include index storage location 258, which may be a register, latches, or any other type of storage location, for storing the index values received in IOREGSEL write transactions, or these values may be stored anywhere else that they may be accessible to redirection unit 250, such as in memory 240.

Interface unit 260 may include any logic, circuitry, or other hardware to transfer signals to and from ICH 200 and/or to and from functional units or other structures within ICH 200. Therefore, interface unit 260 may include or may support any number of input pins, output pins, bidirectional pins, and/or internal signal lines, along with associated circuitry.

Multiplexers 262 may include any logic, circuitry, or other hardware to provide for input pins or signal lines into or within ICH 200 to be switched from one destination to another. In one embodiment, multiplexers 262 provide for the function of an input pin or signal line to be switched between that of interrupt request and that of another function. For example, a number of multiplexer configuration values may be used to switch the function of one or more of the input pins or signal lines of ICH 200, such that the number of interrupt requests supported by ICH 200 may vary. These multiplexer configuration values may be static or dynamically generated, for example by processor 210, and/or may be stored in multiplexer configuration storage location 264, which may be a register, latches, or any other type of storage location.

Messaging unit 270 may include any logic, circuitry, or other hardware to construct messages to be delivered by interface unit 260 in a specified format, such as a message signaled interrupt ("NISI") according to the Peripheral Component Interconnect ("PCI") specification, in which an interrupt message may include a 32-bit address field and a 32-bit data field. For the purpose of constructing these messages, messaging unit 270 may include message address storage location 272 and message data storage location 274, each of which may be a 32-bit register or other storage location.

Within the scope of the present invention, ICH 200 may include some or all or the features illustrated in FIG. 2, and may include any additional features desired. Furthermore, any of the illustrated and/or other logic, circuitry, or other hardware may be included in, omitted from, and/or arranged in ICH 200 according to any approach. For example, emulation unit 212 and/or interrupt controller 230 may be included within processor 200 or be separate. Additionally, features illustrated within ICH 200 in FIG. 2 may be separate from ICH 200 in other embodiments of the present invention. For example, firmware 220 and/or memory 240 may be separate from ICH 200.

Figure 3:
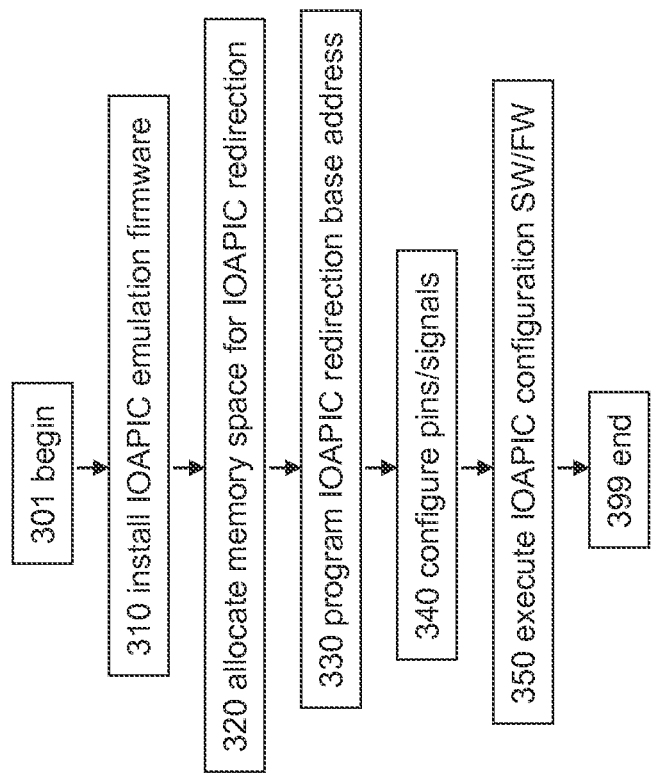
FIG. 3 illustrates a method for configuring a system or apparatus for emulation of an I/O APIC according to an embodiment of the present invention.
Figure 4:
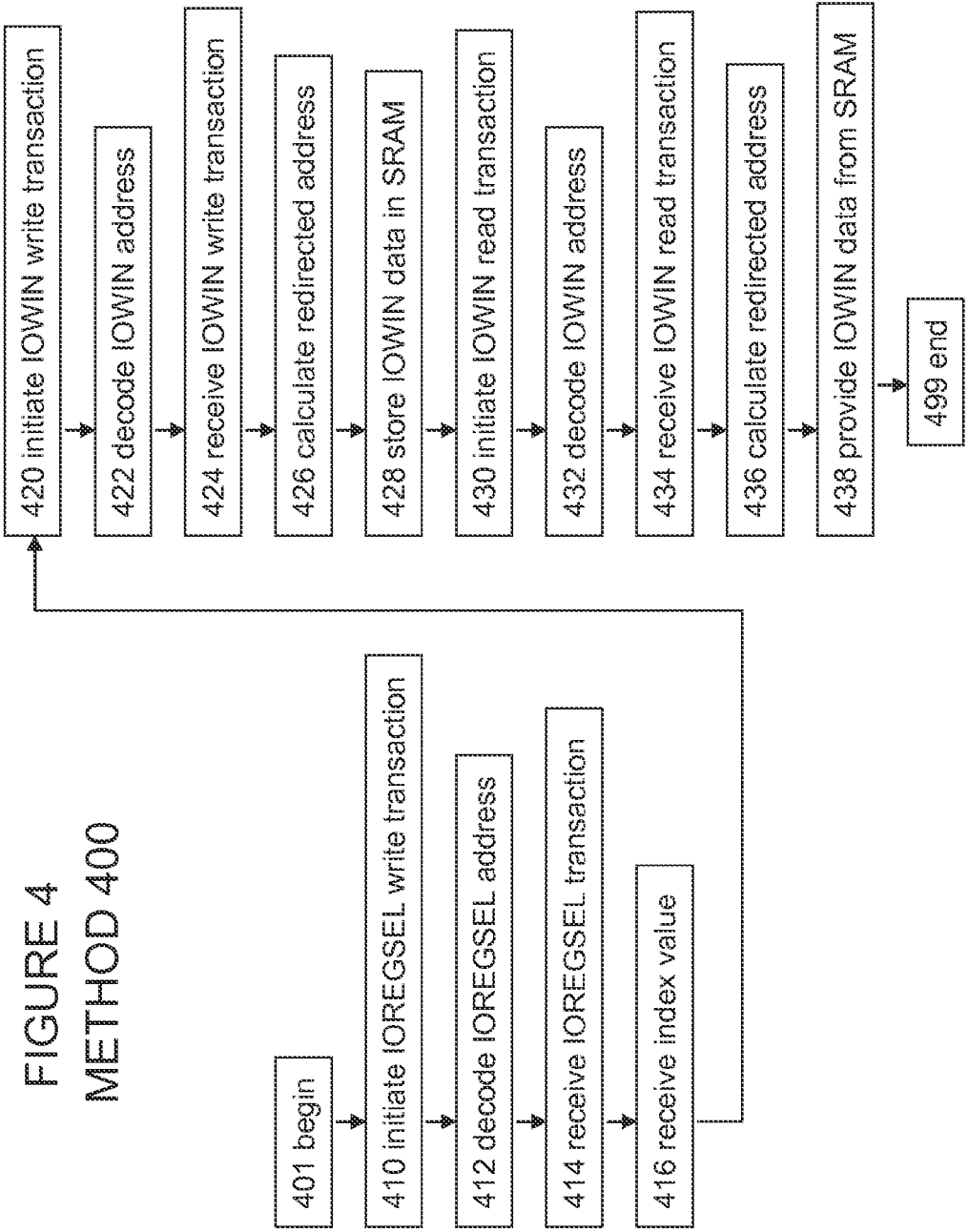
FIG. 4 illustrates a method for performing transactions intended for an APIC according to an embodiment of the present invention.
Figure 5:
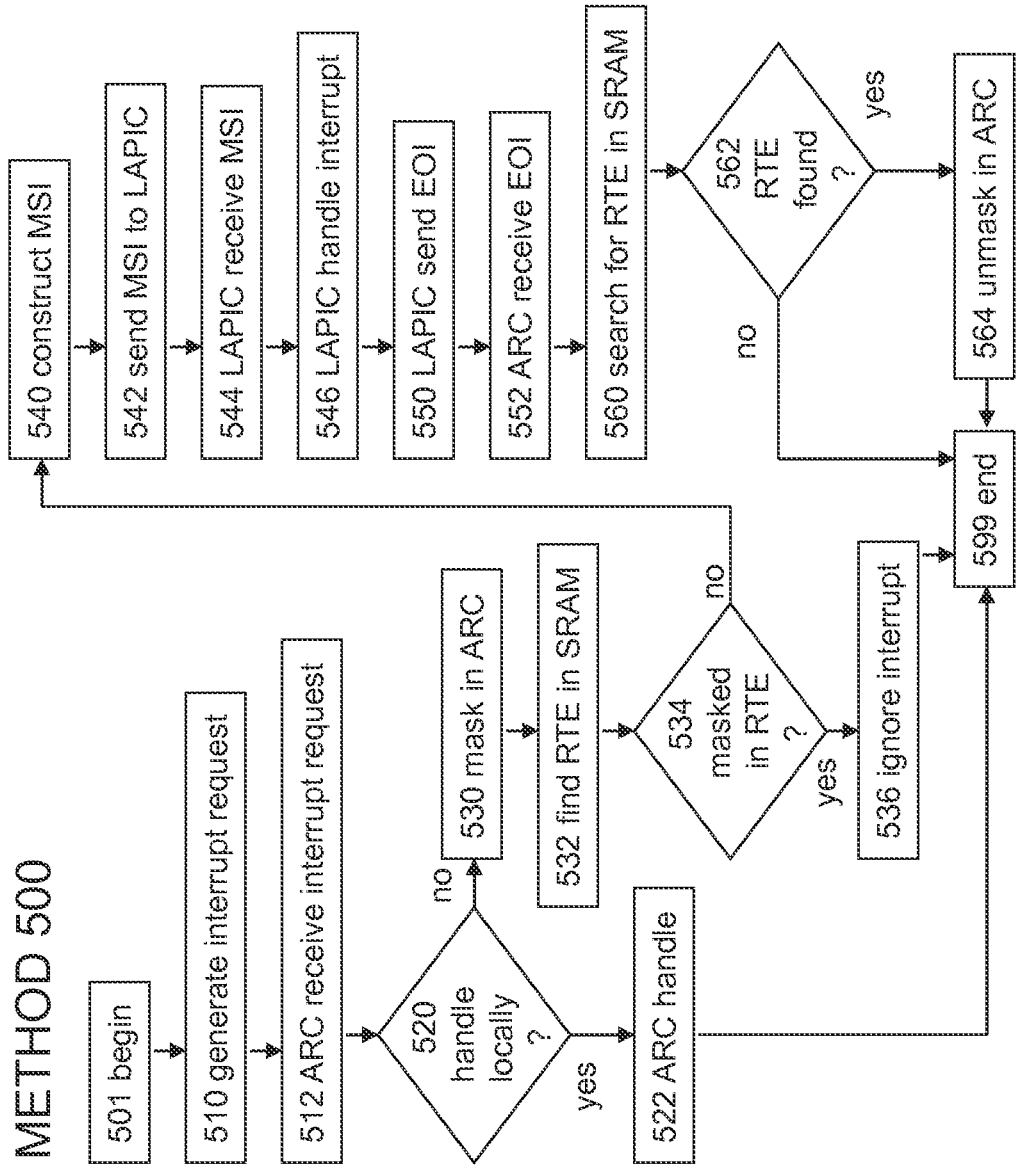
FIG. 5 illustrates a method including emulation of an I/O APIC according to an embodiment of the present invention.

FIGS. 3, 4, and 5 illustrate embodiments of the present invention in methods, specifically method 300 for configuring a system or apparatus for emulating an I/O APIC, method 400 for performing transactions intended for an I/O APIC, and method 500 for emulating an I/O APIC. In the following descriptions of methods 300, 400, and 500, references may be made to elements of FIGS. 1 and 2; however, method embodiments of the present invention are not limited in this respect.

FIG. 3 illustrates method 300 for configuring a system, such as information processing system 100, or apparatus, such as ICH 200, for emulating an I/O APIC. In box 301, method 300 may begin. Actions performed in method 300 may be performed together or separately, at one or more separate locations, by a system manufacturer, vendor, user or any other entity or person, interactively with user input or automatically without user input, with or without the use of configuration software or firmware.

In box 310, I/O APIC emulation firmware, such as emulation firmware 222, may be installed, loaded, programmed, or otherwise added to the information processing system or a component within or intended for the information processing system, together with or separately from other firmware such as firmware 220.

In box 320, a memory space, such as memory space 242, may be allocated for the information that would be stored in and retrieved from the indirectly accessible I/O APIC register set in a prior art information processing system including an I/O APIC. Embodiments of the present invention provide for greater flexibility than would be possible in a prior art information processing system including an I/O APIC. For example, the size of the memory space allocated for the indirectly accessible I/O APIC register set information may be greater or less than the size of the indirectly accessible I/O APIC register set for any desired reason, so tong as the emulation supports the programming model of the I/O APIC. In one embodiment, the memory space may be larger so as to provide more RTEs, and therefore more interrupts, than may be supported with a hardware I/O APIC.

In box 330, a value representing a base address of the memory space allocated in box 320 may be programmed into a redirection storage location such as redirection storage location 254.

In box 340, an interface unit, such as interface unit 260, may be configured to support the emulation of an I/O APIC. For example, values may be stored in a multiplexer configuration storage location, such as multiplexer configuration storage location 264, to configure any number of input pins or signal lines as interrupt requests. Therefore, different embodiments of the present invention may support more, the same, or a fewer number of interrupts than supported by a prior art information processing system having one or more hardware interrupt controllers including an I/O APIC and, for example, an ARC interrupt controller.

In box 350, software or firmware to program or configure an I/O APIC may be executed on the information processing system, even though the information processing system does not include a hardware APIC, because embodiments of the present invention provide for emulation of the programmability of an I/O APIC. The programming or configuration may be performed according to a method embodiment of the present invention such as method 400.

In box 399, method 300 for configuring an information processing system, such as information processing system 100, for emulation of an I/O APIC may end.

FIG. 4 illustrates method 400 for performing transactions intended for an I/O APIC. In box 401, method 400 may begin.

In box 410, a memory write transaction to the IOREGSEL register may be initiated, for example by a processor, agent, or other component in the information processing system that is executing I/O APIC programming or configuration software or firmware, or by a processor, agent, or other component that is responding to or handling an interrupt request. The information transmitted in the IOREGSEL write transaction may include an index value corresponding to any of the indirectly accessible I/O APIC registers, or to any additional registers provided for by the extensibility of embodiments of the present invention. For example, index values corresponding to any number of additional RTEs may be used.

In box 412, the target address transmitted in the IOREGSEL write transaction may be decoded by the processor, agent, or other component providing the functionality to emulate an I/O APIC, for example, by decoder 252 for processor 210 in ICH 200. In box 414, this processor, agent, or other component may receive or respond to the IOREGSEL write transaction. In box 416, the index value transmitted in the IOREGSEL write transaction may be latched or stored, for example in index storage location 258.

In box 420, a memory write transaction to the IOWIN register may be initiated, for example by a processor, agent, or other component in the information processing system that is executing I/O APIC programming or configuration software or firmware, or by a processor, agent, or other component that is responding to or servicing an interrupt request. In box 422, the target address transmitted in the IOWIN write transaction may be decoded by the processor, agent, or other component providing the functionality to emulate an I/O APIC, for example, by decoder 252 for processor 210 in ICH 200. In box 424, this processor, agent, or other component may receive or respond to the IOWIN write transaction. In box 426, the appropriate address in the memory space corresponding to the emulated I/O APIC registers may be found, for example by adding or otherwise combining the index value received in box 416 to the base address stored in box 330. In box 428, the data transmitted in the IOWIN write transaction may be stored at the appropriate location in the memory space corresponding to the emulated I/O APIC registers, for example, memory space 242.

In box 430, a memory read transaction to the IOWIN register may be initiated, for example by a processor, agent, or other component that is responding to or servicing an interrupt request. In box 432, the target address transmitted in the IOWIN read transaction may be decoded by the processor, agent, or other component providing the functionality to emulate an I/O APIC, for example, by decoder 252 for processor 210 in ICH 200. In box 434, this processor, agent, or other component may receive or respond to the IOWIN read transaction. In box 436, the appropriate address in the memory space corresponding to the emulated I/O APIC registers is found, for example by adding or otherwise combining the index value received in box 416 to the base address stored in box 330. In box 438, the data requested in the IOWIN read transaction is retrieved from the appropriate location in the memory space corresponding to the emulated APIC registers, for example, memory space 242.

In box 499, method 400 for performing transactions intended for an I/O APIC may end.

FIG. 5 illustrates method 500 for emulating an I/O APIC. In box 501, method 500 may begin. Actions performed in method 500 may be performed by a processor or controller, such as processor 210, running I/O APIC emulation firmware, such as emulation firmware 222.

In box 510, an interrupt request may be generated within information processing system 100, such as by interrupt source 160. In box 512, the interrupt request may be received by a component in the information processing system having the functionality to emulate an I/O APIC according to an embodiment of the present invention, such as ICH 150. The interrupt request may be received by or through an interface unit such as interface unit 260, and may be received by or through a dedicated, shared, or multiplexed input pin or signal line.

In box 520, a determination may be made as to whether the interrupt request is to be handled locally or remotely. This determination may be made based on the identification of the source of the interrupt request, and the interrupt source may be identified by the input pin or signal line through which the request was received, and/or by polling or otherwise querying a set or a subset of interrupt sources. For example, in information processing system 100, an interrupt request generated by an I/O device controller within ICH 150 may be handled locally by the ARC interrupt controller and ARC processor. If this case, then in box 522, the interrupt request may be handled locally. On the other hand, if the interrupt request is not to be handled locally, then method 500 continues in box 530.

In box 530, the interrupt request may be masked in the ARC interrupt controller, for example by setting a bit in interrupt mask storage location 232, such that the ARC interrupt controller does not respond to it deliver it to the ARC processor. In box 532, the RTE corresponding to the interrupt request may be found in memory space 242. The RTE may be found based on the identification of the interrupt source or the interrupt input signal, because each RTE location in memory space 242 corresponds to a potential interrupt source, just as each RTE register in an I/O APIC corresponds to an interrupt input signal. In box 534, a determination may be made as to whether the interrupt mask bit in the identified RTE is set. If so, then in box 536, the interrupt request may be ignored. If not, then method 500 continues to box 540.

In box 540, the identified RTE may be used to construct an interrupt message, for example by messaging unit 270. To construct the message, information from the RTE, plus any other required information, may be arranged into a specified format, such as the format of PCI MSI, such as by copying information from the RTE in memory space 242 to message address storage location 272 and message data storage location 274. For example, information from the destination field of the RTE may be used in the MSI address field, and information from the interrupt vector field of the RTE may be used in the MSI data field.

In box the interrupt message may be transmitted to one or more local APICs, for example as a memory write transaction through interface unit 260. In box 544, a local APIC may receive and/or respond to the interrupt message. For example, local APIC 112 may receive and/or respond to interrupt messages to be serviced by processor 110. In box 546, the responding local API and its corresponding processor may begin to handle the interrupt. In handling the interrupt, the local APIC and/or its corresponding processor may initiate transactions directed to an I/O APIC. These transactions may be received and handled according to a method embodiment of the present invention for performing transactions intended for an I/O APIC, such as method 400.

In box 550, the responding local APIC may initiate an end of interrupt ("EOI") message to indicate the completion of the servicing of the interrupt. The EOI message may be a memory write transaction intended for an I/O APIC's EOI register, according to a method embodiment for performing transactions intended for an I/O APIC, such as method 400. In box 552, ICH 150 may receive and/or respond to the EOI message, also according to a method embodiment such as method 400.

In box 560, memory space 242 may be searched for an RTE corresponding to the interrupt for which the EOI message was sent. The RTE may be searched for based on the vector included in the EOI message and/or the vector written to the location in memory space 242 that corresponds to an I/O APIC's EOI register. In box 562, if an RTE is found, then that means that the interrupt is an I/O APIC interrupt that would have been masked in the ARC interrupt controller as in box 530, so then in box 564, the interrupt is unmasked in the ARC interrupt controller. The interrupt may be unmasked in the ARC interrupt controller by clearing a bit in interrupt mask storage location 232. Identification of which interrupt is to be unmasked in the ARC interrupt controller may be based on which RTE (i.e., the RTE corresponding to which interrupt request source or signal, indicated by the index value) was found. If in box 562 an RTE is not found, then that means that the interrupt is an ARC interrupt that would not have been masked in the ARC interrupt controller, so no unmasking is performed.

In box 599, method 500 for emulating an I/O APIC may end.

Within the scope of the present invention, the methods illustrated in FIGS. 3, 4, and 5 and/or the actions taken in performing methods 300, 400, and 500 may be performed together or separately, in a different order, with illustrated boxes omitted, with additional boxes added, or with a combination of reordered, omitted, or additional boxes. For example, the interrupt message construction and delivery described in boxes 530 to 546 in method 500 may be performed various times for various interrupt requests, and the EOI handling described in boxes 550 to 564 may be performed at various times for each of these interrupt requests.

Thus, embodiments of systems, apparatuses, and methods for emulating an I/O APIC have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   a first interrupt controller having a first programming model; and
   emulation logic to emulate a second interrupt controller having a second programming model different from the first programming model, wherein the second programming model is an Advanced Programmable Interrupt Controller programming model, and to mask one of a plurality of interrupt requests to the first interrupt controller for each of the plurality of interrupt requests handled by the emulation logic.

2. The apparatus of claim 1, wherein the second interrupt controller is an input/output Advanced Programmable Interrupt Controller.

3. The apparatus of claim 1, wherein the first interrupt controller includes a plurality of mask indicators, and the emulation logic is to mask one of the plurality of interrupt requests to the first interrupt controller using one of the plurality of mask indicators.

4. The apparatus of claim 1, further comprising a random access memory to store information corresponding to contents of the register set of the second interrupt controller.

5. The apparatus of claim 4, further comprising a decoder to decode transactions intended for the second interrupt controller.

6. The apparatus of claim 5, further comprising redirection logic to redirect transactions intended for the second interrupt controller to the random access memory.

7. The apparatus of claim 1, further comprising messaging logic to construct an interrupt message for each of the plurality of interrupts handled by the emulation logic.

8. A method comprising:
   receiving an interrupt request;
   blocking the interrupt request in a first interrupt controller having a first programming model; and
   emulating a second interrupt controller to handle the interrupt request, the second interrupt controller having a second programming model different from the first programming model, wherein the second programming model is an Advanced Programmable Interrupt Controller programming model.

9. The method of claim 8, further comprising determining whether the interrupt request is to be handled locally, wherein blocking the interrupt request and emulating the second interrupt controller is performed only if the interrupt request is not to be handled locally.

10. The method of claim 9, wherein the second interrupt controller is an input/output Advanced Programmable Interrupt Controller.

11. The method of claim 10, further comprising finding, in a random access memory, a redirection table entry corresponding to the interrupt request.

12. The method of claim 11, further comprising constructing, based on information from the redirection table entry, an interrupt message.

13. The method of claim 12, further comprising sending the interrupt message to a local Advanced Programmable Interrupt Controller.

14. The method of claim 13, further comprising receiving an end-of-interrupt message from the local Advanced Programmable interrupt Controller.

15. The method of claim 14, further comprising finding, in the random access memory, the redirection table entry based on vector information from the end-of-interrupt message.

16. The method of claim 15, further comprising unblocking the interrupt request in the first interrupt controller in response to finding the redirection table entry based on vector information from the end-of-interrupt message.

17. The method of claim 11, further comprising, prior to finding the redirection table entry in the random access memory, storing information in a location allocated for the redirection table entry in the random access memory, the information received in a transaction intended for the input/output Advanced Programmable Interrupt Controller.

18. The method of claim 17, further comprising, prior to storing information in a location allocated for the redirection table entry in the random access memory, decoding the transaction intended for the input/output Advanced Programmable Interrupt Controller and redirecting the transaction to the random access memory.

19. A system comprising:
   a first processor including a first interrupt controller having a first programming model, wherein the first programming model is an Advanced Programmable Interrupt Controller programming model;
   a second processor to control a plurality of input/output devices, the second processor including a second interrupt controller having a programming model different from the first programming model; and
   firmware to cause the second processor to emulate the first interrupt controller and to block interrupt requests to the second interrupt controller in response to an interrupt request that is not to be serviced by the second processor.

20. The system of claim 19, further comprising:
   a random access memory; and
   redirection logic to decode transactions intended for the first interrupt controller and
   redirect the transactions to the random access memory.

* * * * *